(12) United States Patent
Jarboe et al.

(10) Patent No.: US 8,122,305 B2
(45) Date of Patent: Feb. 21, 2012

(54) STANDALONE DATA STORAGE DEVICE ELECTROMAGNETIC INTERFERENCE TEST SETUP AND PROCEDURE

(75) Inventors: Charles Jarboe, Cedar Park, TX (US); Robert Clausen, Austin, TX (US); Jeffrey C. Hailey, Austin, TX (US); Mark Lindholm, Austin, TX (US); Raymond McCormick, Round Rock, TX (US); Kevin Marks, Round Rock, TX (US)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 12/698,500

(22) Filed: Feb. 2, 2010

(65) Prior Publication Data

US 2010/0138705 A1 Jun. 3, 2010

Related U.S. Application Data

(62) Division of application No. 11/619,252, filed on Jan. 3, 2007, now Pat. No. 7,716,540.

(51) Int. Cl.
*G01R 31/28* (2006.01)
(52) U.S. Cl. ........................................ 714/716
(58) Field of Classification Search .................. 714/717, 714/716, 712, 718, 750, 799, 742, 703; 29/603.09; 365/185.33, 189.011, 230.03
See application file for complete search history.

(56) References Cited

U.S. PATENT DOCUMENTS

| | | | |
|---|---|---|---|
| 5,299,195 A * | 3/1994 | Shah | 370/462 |
| 5,384,767 A * | 1/1995 | Moorwood et al. | 370/408 |
| 5,548,432 A | 8/1996 | Clarke et al. | |
| 5,553,059 A * | 9/1996 | Emerson et al. | 370/248 |
| 6,950,968 B1 | 9/2005 | Parolari et al. | |
| 7,031,669 B2 | 4/2006 | Vaidyanathan et al. | |
| 7,093,172 B2 * | 8/2006 | Fan et al. | 714/716 |
| 7,236,750 B2 | 6/2007 | Vaidyanathan et al. | |
| 7,437,643 B2 * | 10/2008 | Khanna et al. | 714/733 |
| 7,444,558 B2 * | 10/2008 | Mitbander et al. | 714/716 |
| 7,477,467 B1 * | 1/2009 | Sutardja | 360/46 |
| 7,562,285 B2 | 7/2009 | Yang et al. | |
| 7,646,555 B2 * | 1/2010 | Sutardja | 360/31 |
| 7,783,956 B2 * | 8/2010 | Ko et al. | 714/763 |
| 7,852,585 B1 * | 12/2010 | Sutardja | 360/46 |
| 2005/0204078 A1 * | 9/2005 | Steinmetz et al. | 710/38 |
| 2007/0094410 A1 * | 4/2007 | Voigt et al. | 709/237 |
| 2008/0013609 A1 | 1/2008 | Daxer et al. | |
| 2008/0144707 A1 | 6/2008 | Tsfati et al. | |
| 2009/0249139 A1 | 10/2009 | Wang et al. | |

* cited by examiner

*Primary Examiner* — Phung M Chung
(74) *Attorney, Agent, or Firm* — Haynes and Boone, LLP

(57) ABSTRACT

A system for operating a data storage device having a plurality of sectors and at least one port, each port having a transmitter and a receiver, is disclosed. In one embodiment the system includes coupling at least one of the transmitters to at least one of the receivers, providing power to the data storage device, detecting that the transmitter is coupled to the receiver, and executing code for exercising the data storage device.

16 Claims, 4 Drawing Sheets

| BYTE/BIT | 7 | 6 | 5 | 4 | 3 | 2 | 1 | 0 |
|---|---|---|---|---|---|---|---|---|
| 0 | RESERVED | | | | | | ADDRESS FRAME TYPE (0h) 340 | |
| 1 | DEVICE TYPE 310 | | | | RESERVED 340 | REASON 340 | | RESTRICTED (FOR OPEN ADDRESS FRAME) 340 |
| 2 | RESERVED 310 | | | | SSP INITIATOR PORT | STP INITIATOR PORT | SMP INITIATOR PORT | RESTRICTED (FOR OPEN ADDRESS FRAME) |
| 3 | RESERVED 310 | | | | SSP TARGET PORT | STP TARGET PORT | SMP TARGET PORT | |
| 4–11 | DEVICE NAME 320 | | | | | | | |
| 12–19 | SAS ADDRESS 330 | | | | | | | |
| 20 | PHY IDENTIFIER 340 | | | | | | | |
| 22 | RESERVED 310 | | | | | INSIDE ZPSDS PERSISTENT | REQUESTED INSIDE ZPSDS | BREAK_REPLY CAPABLE |
| 23–27 | RESERVED 340 | | | | | | | |
| 28 (MSB) | CRC 340 | | | | | | | |
| 31 | | | | | | | | (LSB) |

Fig. 3

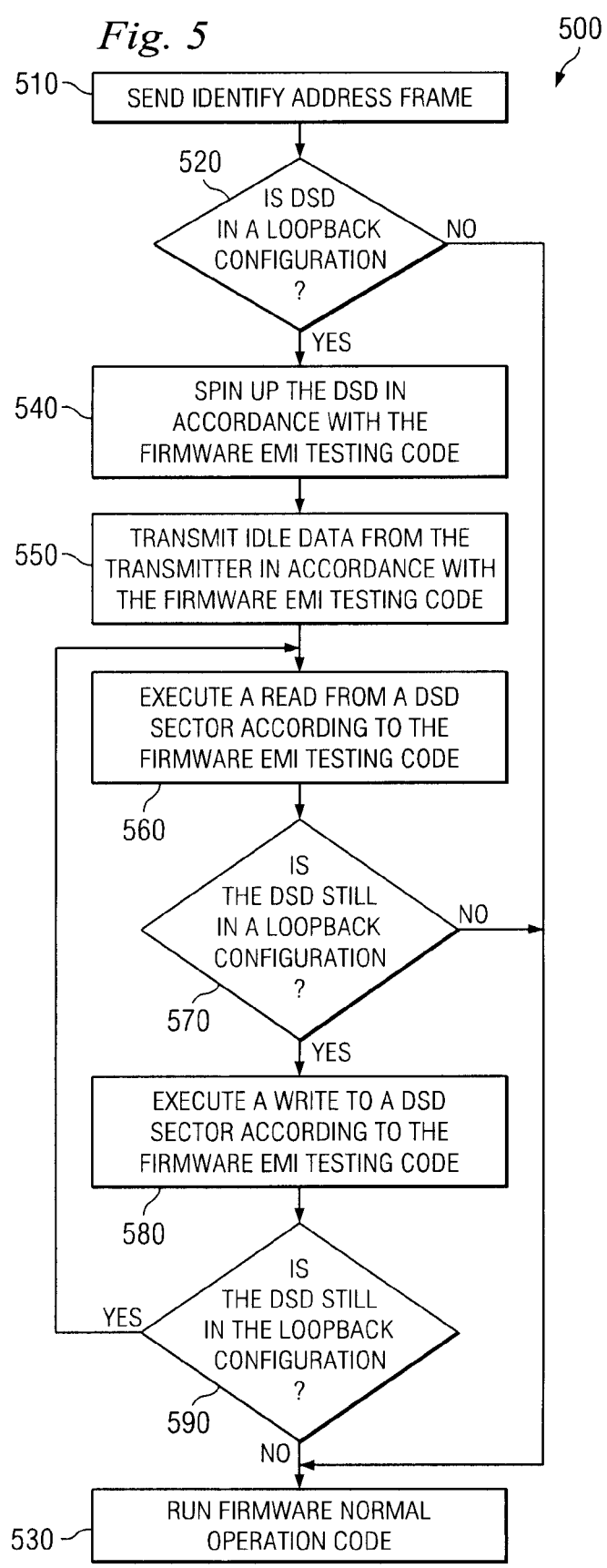

STANDALONE DATA STORAGE DEVICE ELECTROMAGNETIC INTERFERENCE TEST SETUP AND PROCEDURE

The present application is a Divisional of U.S. Utility application Ser. No. 11/619,252, filed on Jan. 3, 2007, now U.S. Pat. No. 7,716,540, the disclosure of which is herein incorporated by reference in its entirety.

BACKGROUND

The description herein relates generally to information handling systems and specifically to data storage device characterization.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

A data storage device is a source of electromagnetic interference (EMI) emissions. These EMI emissions can adversely affect computing devices and are regulated by the Federal Communications Commission (FCC) and the European Union (EU). It has been determined that measuring the EMI emissions from the data storage device can provide an early criterion for data storage device characterization. Conventionally, EMI testing of the data storage device requires a host computer. Waiting for the host computer to be available can result in delayed testing and increased costs. Additionally, the host computer may introduce variables that can compromise or mask the EMI emissions of the data storage device.

Accordingly, it would be desirable to provide an EMI testing setup and procedure absent the disadvantages discussed above.

SUMMARY

According to an embodiment, a system for operating a data storage device having a plurality of sectors and at least one port, each port having a transmitter and a receiver, includes coupling at least one of the transmitters to at least one of the receivers, providing power to the data storage device, and in response to detecting that the transmitter is coupled to the receiver, executing code for exercising the data storage device.

BRIEF DESCRIPTION OF THE DRAWINGS

FIG. 3 illustrates an embodiment of a Serial Attached Small Computer Systems Interface (SAS) IDENTIFY address frame format.

FIG. 5 contains a flowchart for an embodiment of a method of operating a data storage device.

DETAILED DESCRIPTION

For purposes of this disclosure, an IHS includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a network storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit communications between the various hardware components.

Figure 1:
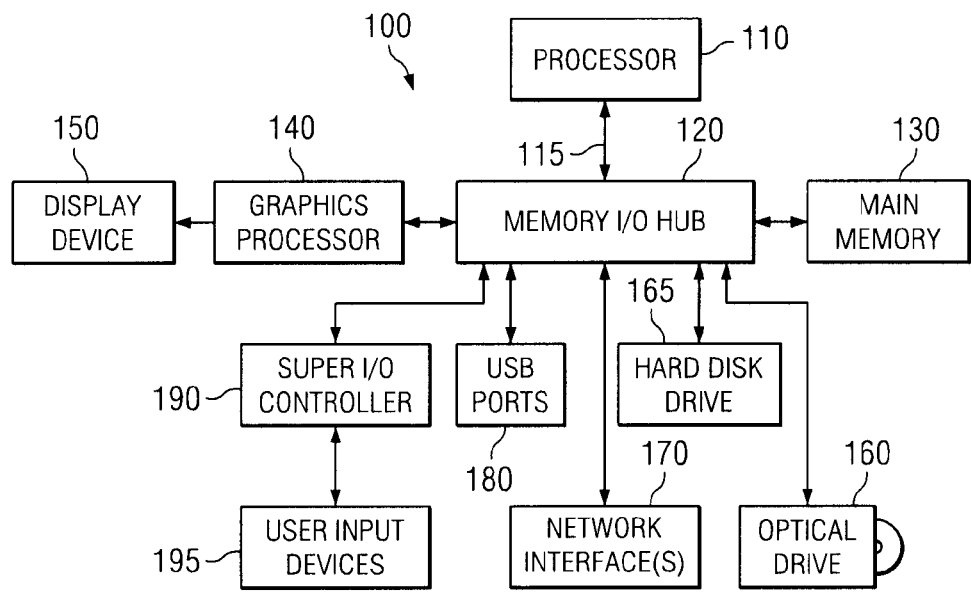
FIG. 1 is a block diagram illustrating an embodiment of an IHS.

FIG. 1 is a block diagram of an embodiment of an IHS. The IHS 100 includes a processor 110 such as an Intel Pentium series processor or one of many other processors currently available. A memory I/O hub chipset 120 (comprising one or more integrated circuits) connects to processor 110 over a front-side bus 115. Memory I/O hub 120 provides the processor 110 with access to a variety of resources. Main memory 130 connects to memory I/O hub 120 over a memory bus. A graphics processor 140 also connects to memory I/O hub 120, allowing the graphics processor to communicate, e.g., with processor 110 and main memory 130. Graphics processor 140, in turn, provides display signals to a display device 150.

Other resources can also be coupled to the system through memory I/O hub 120, including an optical drive 160 or other removable-media drive, one or more hard disk drives 165, one or more network interfaces 170, one or more USB (Universal Serial Bus) ports 180, and a super I/O controller 190 to provide access to user input devices 195, etc.

Not all IHSs include each of the components shown in FIG. 1, and other components not shown may exist. Furthermore, some components shown as separate may exist in an integrated package or be integrated in a common integrated circuit with other components. As can be appreciated, many systems are expandable, and include or can include a variety of components, including redundant or parallel resources.

Figure 2:
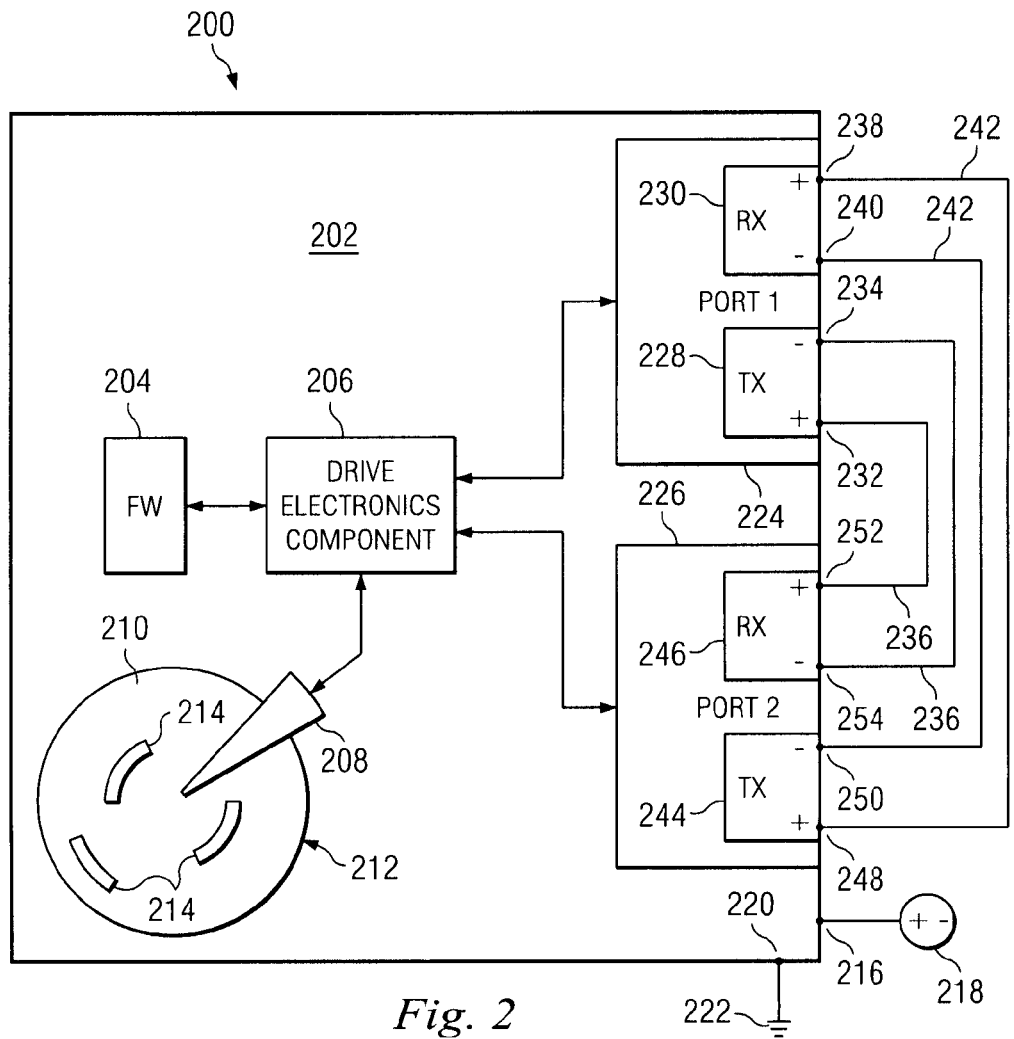
FIG. 2 depicts an embodiment of a data storage device connected in a loopback configuration.

FIG. 2 illustrates an embodiment of a data storage device connected in a loopback configuration 200. A hard disk drive 202 is depicted. The hard disk drive 202 includes firmware 204. The firmware 204 is coupled to a drive electronics component 206. The drive electronics component 206 is coupled to a read/write head assembly 208. The read/write head assembly 208 stores information to and reads information from a hard disk platter 210 of a hard disk 212. The hard disk 212 includes a plurality of platters 210, with each platter 210 including a plurality of sectors 214. The hard disk drive 202 further includes a power terminal 216 for providing power 218 and a ground terminal 220 for providing a connection to ground 222.

Referring again to the drive electronics component 206, the drive electronics component 206 is coupled to a first data port 224 and a second data port 226. The first data port 224 includes a first transmitter 228 and a first receiver 230. The first transmitter 228 includes a first transmitter positive interface 232 and a first transmitter negative interface 234 for sending a differential pair of signals 236. The first receiver 230 includes a first receiver positive interface 238 and a first receiver negative interface 240 for receiving a differential pair of signals 242. The second data port 226 includes a second transmitter 244 and a second receiver 246. The second transmitter 244 includes a second transmitter positive interface 248 and a second transmitter negative interface 250 for sending the differential pair of signals 242. The second receiver 246 includes a second receiver positive interface 252 and a second receiver negative interface 254 for receiving the differential pair of signals 236.

To configure hard disk drive 202 for loopback operation, the first transmitter positive interface 232 is coupled to the second receiver positive interface 252. The first transmitter negative interface 234 is coupled to the second receiver negative interface 254. The second transmitter positive interface 248 is coupled to the first receiver positive interface 238. The second transmitter negative interface 250 is coupled to the first receiver negative interface 240. A specially designed connector such as, for example, a specially designed Serial Attached Small Computer Systems Interface (SAS) receptacle connector, may be used to provide these couplings and provide power to the hard disk drive 202.

FIG. 3 illustrates an embodiment of a SAS IDENTIFY address frame 300. The SAS IDENTIFY address frame 300 is used as an identification sequence for device-to-device communication and contains information about the transmitting SAS device. The SAS IDENTIFY address frame 300 contains: a plurality of Reserved fields 310, including byte 0 bit 7, bytes 1, 2 and 3 bits 4-7, byte 22 bits 3-7, and bytes 23-27 bits 0-7; an SSP Target Port bit 320 at byte 3 bit 3; a Device Name field 330 at bytes 4-11 bits 0-7; and a plurality of other fields 340.

Figure 4A:
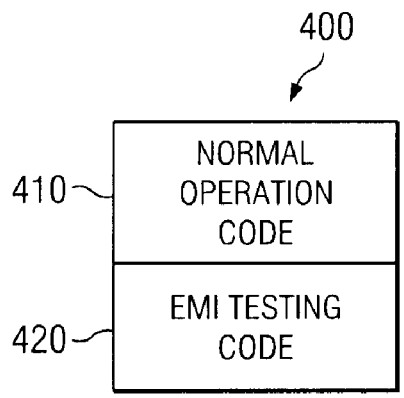
FIG. 4a illustrates an embodiment of a firmware image.

FIG. 4a illustrates an embodiment of a firmware image 400. The firmware image 400 is bifurcated into a first section having normal operation code 410 for use during normal operation of the hard disk drive 202 and a second section having EMI testing code 420 for use during EMI emissions testing of the hard disk drive 202.

Figure 4B:
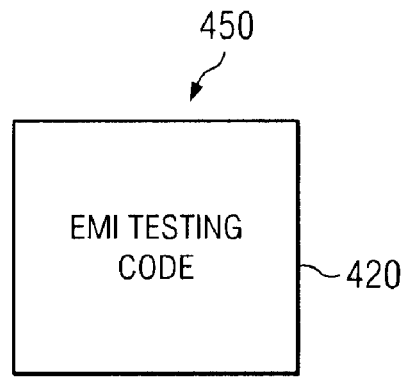
FIG. 4b illustrates an embodiment of a firmware image.

FIG. 4b also illustrates an embodiment of a firmware image 450. The embodiment of the firmware image 450 depicted includes EMI testing code 420 used during EMI emissions testing of the hard disk drive 202 but does not include normal operation code 410 for use during normal operation of the hard disk drive 202. In such an embodiment, in order to operate the hard disk drive 202 without running the EMI testing code, a new firmware image containing normal operation code 410 will have to be downloaded.

FIG. 5 contains a flowchart for an embodiment of a method 500 of operating the hard disk drive 202. This method allows, for example, EMI testing of the hard disk drive 202 without the hard disk drive 202 being connected in the IHS 100.

The method 500 begins with the first transmitter 228 sending at step 510 a first SAS IDENTIFY address frame 300 to the second receiver 242 and the second transmitter 244 sending at step 510 a second SAS IDENTIFY address frame 300 to the first receiver 230 in response to being instructed to do so by the firmware 204 when power 218 is provided to the hard disk drive 202. Based on the information received in the first SAS IDENTIFY address frame 300 and the second SAS IDENTIFY address frame 300, the firmware 204 will determine at step 520 whether the hard disk drive 202 is in the loopback configuration 200. This can be accomplished by utilizing one of the SAS IDENTIFY address frame 300 fields such as, for example, the Reserved field 310, the SSP Target Port bit 320, or the Device Name field 330.

In an embodiment utilizing the Device Name field 330, the first transmitter 228 will send the first SAS IDENTIFY address frame 300 to the second receiver 246, the first SAS IDENTIFY address frame 300 including a globally unique Device Name for the hard disk drive 202, and the second transmitter 244 will send the second SAS IDENTIFY address frame 300 to the first receiver 230, the second SAS IDENTIFY address frame 300 including the globally unique Device Name for the hard disk drive 202. In such an embodiment, when the second receiver 246 receives the first SAS IDENTIFY address frame 300 including the globally unique Device Name associated with the hard disk drive 202 and the first receiver 230 receives the second SAS IDENTIFY address frame 300 including the globally unique Device Name associated with the hard disk drive 202, the firmware 204 will determine at step 520 that the hard disk drive 202 is in the loopback configuration 200.

In an embodiment utilizing a Reserved field 310, the first transmitter 228 will send the first SAS IDENTIFY address frame 300 to the second receiver 246, the first SAS IDENTIFY address frame 300 including a designated bit string in one of the Reserved fields 310, and the second transmitter 244 will send the second SAS IDENTIFY address frame 300 to the first receiver 230, the second SAS IDENTIFY address frame 300 including a designated bit string in one of the Reserved fields 310. In such an embodiment, when the second receiver 246 receives the first SAS IDENTIFY address frame 300 having the designated bit string in one of the Reserved fields 310 and the first receiver 230 receives the second SAS IDENTIFY address frame 300 having the designated bit string in one of the Reserved fields 310, the firmware 204 will determine at step 520 that the hard disk drive 202 is in the loopback configuration 200.

In an embodiment utilizing the SSP Target Port bit 320, the first transmitter 228 will send the first SAS IDENTIFY address frame 300 to the second receiver 246, the first SAS IDENTIFY address frame 300 having the SSP Target Port bit 320 set to one, and the second transmitter 244 will send the second SAS IDENTIFY address frame 300 to the second receiver 246, the second SAS IDENTIFY address frame 300 having the SSP Target bit 320 set to one. In such an embodiment, when the second receiver 246 receives the first SAS IDENTIFY address frame 300 with the SSP Target Port bit 320 set to one and the first receiver 230 receives the second SAS IDENTIFY address frame 300 with the SSP Target Port bit 320 set to one, the firmware 204 will determine at step 520 that the hard disk drive 202 is in the loopback configuration 200.

If the loopback configuration 200 is not detected, the firmware 204 will run the normal operation code at step 530. In another embodiment, the firmware 204 may include EMI testing code 420 without also including normal operation code 410. In such an embodiment, when the loopback configuration 200 is not detected, the firmware 204 will halt the running of the EMI testing code 420 without proceeding to step 530 for running the normal operation code 530.

If the loopback configuration 200 is detected, the method 500 then proceeds to step 540 where the hard disk drive 202 spins up in accordance with the firmware 204 EMI testing code 420. The firmware 204 EMI testing code 420 will allow the hard disk drive 202 to spin up at step 540 without receiving a NOTIFY (ENABLE SPINUP) primitive.

The method 500 then proceeds to the next step where the first transmitter 228 sends idle data at step 550 to the second receiver 242 and the second transmitter 244 sends idle data at step 550 to the first receiver 230. The idle data is sent at step 550 to maintain synchronization until other information is transmitted.

The method 500 then proceeds to step 560 where a read is executed by the firmware 204 EMI testing code 240 from one of the hard disk drive sectors 214. Executing the read at step 560 comprises the hard disk drive 202 using all normal data paths and components on the hard disk drive 202.

The method 500 then proceeds to step 570 where the firmware 204 determines whether the hard disk drive 202 is still in the loopback configuration 200. If the loopback configuration 200 is not detected, the firmware 204 will run the normal operation code at step 530.

If the loopback configuration 200 is detected, the method 500 then proceeds to the step 580 where a write is executed, by the firmware 204 EMI testing code 240, to one of the hard disk drive sectors 214. Executing the write at step 580 comprises the hard disk drive 202 using all normal data paths and components on the hard disk drive 202.

The method 500 then proceeds to the next step where the firmware 204 determines at step 590 whether the hard disk drive 202 is still in the loopback configuration 200. If the loopback configuration 200 is not detected, the firmware 204 will run the normal operation code at step 530.

If the loopback configuration 200 is detected, the method 500 proceeds to step 560. The firmware 204 will continue to execute steps 560-590 as long as the loopback configuration 200 is detected. While cycling through steps 560-590, the firmware 204 will execute at step 560 a plurality of reads from all sectors 214 of the hard disk drive 202, the plurality of reads being of varying block sizes and will execute at step 580 a plurality of writes to all sectors 214 of the hard disk drive 202, the plurality of writes being of varying block sizes. When the loopback configuration 200 is no longer detected, the firmware 204 will run the normal operation code at step 530.

Figure 6:
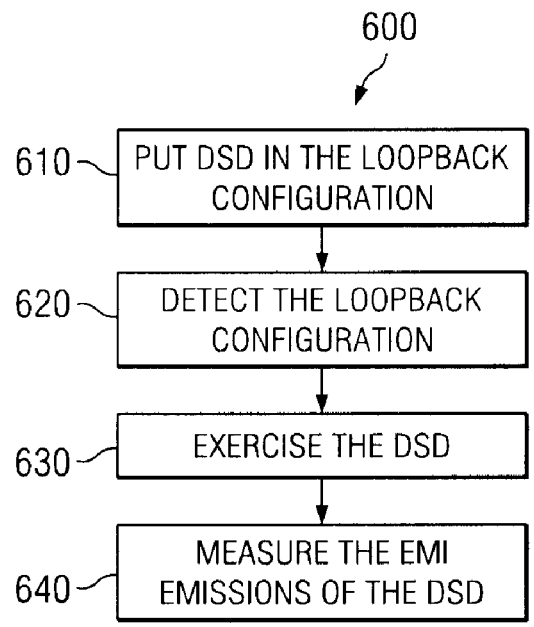
FIG. 6 illustrates a flowchart for an embodiment of a method of testing data storage device electromagnetic interference emissions.

FIG. 6 illustrates a flowchart for an embodiment of a method 600 of testing hard disk drive 202 EMI emissions. The method 600 begins at step 610 with putting the hard disk drive 202 in the loopback configuration 200 by coupling the first transmitter 228 to the second receiver 246 and coupling the second transmitter 244 to the first receiver 230. The method then proceeds to step 620 where the firmware 204 detects the loopback configuration 200 between the ports. The method 600 then proceeds to step 630 where the hard disk drive 202 is exercised. The step 630 of exercising the hard disk drive 202 is substantially similar to steps 560-590 of the method 500 of operating the hard disk drive 202 as described above. The method 600 then proceeds to step 640 where the EMI emissions of the hard disk drive 202 are measured.

The standalone data storage device EMI test setup and procedure can also be used to understand the EMI emissions spectrum of multiple data storage devices. Additionally, it can be used for chassis characterization by measuring and comparing the EMI emissions of the standalone data storage device(s) when the standalone data storage device(s) is/are inside of a chassis and when the standalone data storage device(s) is/are outside of the chassis.

Although illustrative embodiments have been shown and described, a wide range of modification, change and substitution is contemplated in the foregoing disclosure. For example, although the data storage device illustrated is the hard disk drive 202, in another embodiment, the drive may be another type of magnetic disk drive or even an optical disk drive, a magneto-optical disk drive, a tape drive, card reader/ drive, circuitry with non-volatile RAM, circuitry with RAM, or a flash memory device. In such embodiments, exercising the data storage device comprises executing a plurality of reads from data storage locations and executing a plurality of writes to data storage locations. Furthermore, although the loopback configuration 200 is shown using two data ports, in another embodiment the loopback configuration may be set up using a different number of data ports such as, for example, one data port or more than two data ports. In an embodiment having only one data port, the loopback configuration 200 may consist of the port having its own transmitter looped back to its own receiver. Also, in an embodiment having more than one port, the loopback configuration 200 may consist of each port may have its own transmitter looped back to its own receiver. Additionally, in another embodiment the firmware 204 EMI emissions testing code 420 may share some code segments with the firmware 204 normal operation code 410. Also, although SAS is the communication technology illustrated above, in another embodiment, another type of communication technology could be used such as, for example, SATA, Fibre Channel, InfiniBand, Firewire, USB, or PCI Express. In some instances, some features of the embodiments may be employed without a corresponding use of other features. Accordingly, it is appropriate that the appended claims be construed broadly and in a manner consistent with the scope of the embodiments disclosed herein.

What is claimed is:

1. A data storage device, comprising:
a standalone storage drive that is operable to be housed in an Information Handling System (IHS) chassis to provide storage for an IHS, the standalone storage device including:
a first data port located on the standalone storage device and having a first transmitter and a first receiver;
a second data port located on the standalone storage device and having a second transmitter and a second receiver; and
firmware housed in the standalone storage drive that, when executed by a firmware execution component that is located in the standalone storage drive, causes the firmware execution component to:
detect a loopback configuration between the first data port and the second data port when the standalone storage device is not housed in the IHS chassis to provide storage for the IHS, wherein the loopback configuration includes the first transmitter coupled to the second receiver and the second transmitter coupled to the first receiver; and
in response to detecting the loopback configuration, exercise the standalone storage drive by causing the standalone storage drive to perform operations such that the standalone storage drive produces electromagnetic interference (EMI) emissions.

2. The data storage device of claim 1, further comprising:
a connector providing the loopback configuration between first data port and the second data port.

3. The data storage device of claim 2, wherein the connector is configured to provide power to the data storage device.

4. The data storage device of claim 1, wherein the firmware is operational when the data storage device is not coupled to a computer.

5. An electronics device, comprising:
- a standalone device that is operable to be housed in an Information Handling System (IHS) chassis to provide a function for an IHS, the standalone device having a storage that includes instructions that, when executed by an instruction execution component of the electronics device, cause the instruction execution component to:
  - detect a loopback port configuration between a first port transmitter and a second port receiver on the electronics device, wherein the loopback configuration is detected when the standalone device is not housed in the IHS chassis to provide the function for the IHS; and
  - exercise an electromagnetic interference (EMI) producing component in the standalone device in response to detecting the loopback port configuration, wherein the exercising includes operating the EMI producing component to produce EMI emissions.

6. The electronics device of claim 5, wherein exercising the EMI producing component includes executing a plurality of reads from a hard disk in the standalone device and executing a plurality of writes to the hard disk in the standalone device.

7. The electronics device of claim 6, wherein the plurality of reads are of varying block sizes and the plurality of writes are of varying block sizes.

8. The electronics device of claim 6, wherein executing the plurality of reads from the hard disk in the standalone device comprises executing reads from all of a plurality of sectors on the hard disk and the executing the plurality of writes to the hard disk in the standalone device comprises executing writes to all of the plurality of sectors on the hard disk.

9. The electronics device of claim 6, wherein executing the plurality of reads comprises the standalone device using all normal data paths and components on the standalone device for executing the plurality of reads and the executing the plurality of writes comprises the standalone device using all normal data paths and components on the standalone device for executing the plurality of writes.

10. The electronics device of claim 5, wherein the instructions are executable by the instruction execution component in the standalone device to spin up a hard disk in the standalone device.

11. The electronics device of claim 5, wherein the instructions are executable by the instruction execution component in the standalone device to transmit idle data from the first port transmitter to the second port receiver.

12. The electronics device of claim 5, wherein the instructions are executable by the instruction execution component in the standalone device to detect that the loopback configuration between the first port transmitter and the second port receiver no longer exists and, in response, end exercising the standalone device.

13. The electronics device of claim 5, wherein detecting a loopback configuration on the standalone device includes utilizing a Serial Attached Small Computer Systems Interface (SAS) IDENTIFY address frame feature.

14. The electronics device of claim 13, wherein the SAS IDENTIFY address frame feature is selected from a group consisting of an SSP Target Port field, a Reserved field, a Device Name field, and combinations thereof.

15. A method for testing data storage device electromagnetic interference, comprising:
- providing a data storage device having at least one first port transmitter and at least one second port receiver;
- coupling the at least one first port transmitter to the at least one second port receiver;
- detecting a loopback configuration in response to coupling the at least one first port transmitter to the at least one second port receiver;
- exercising the data storage device in response to detecting the loopback configuration; and
- measuring an electromagnetic interference emissions of the data storage device in response to exercising the data storage device.

16. The method of claim 15, wherein the data storage device is not located in a computer chassis.

* * * * *